United States Patent
Kurabayashi

(10) Patent No.: US 10,561,939 B2
(45) Date of Patent: Feb. 18, 2020

(54) INFORMATION PROCESSING SYSTEM, SERVER, AND PROGRAM

(71) Applicant: CYGAMES, INC., Tokyo (JP)

(72) Inventor: Shuichi Kurabayashi, Tokyo (JP)

(73) Assignee: CYGAMES, INC., Tokyo (JP)

(*) Notice: Subject to any disclaimer, the term of this patent is extended or adjusted under 35 U.S.C. 154(b) by 43 days.

(21) Appl. No.: 15/818,426

(22) Filed: Nov. 20, 2017

(65) Prior Publication Data

US 2018/0071625 A1 Mar. 15, 2018

Related U.S. Application Data

(63) Continuation of application No. PCT/JP2016/064610, filed on May 17, 2016.

(30) Foreign Application Priority Data

May 20, 2015 (JP) .................. 2015-102894

(51) Int. Cl.
A63F 13/35 (2014.01)
A63F 13/75 (2014.01)

(52) U.S. Cl.
CPC ............ *A63F 13/35* (2014.09); *A63F 13/75* (2014.09)

(58) Field of Classification Search
CPC .......... A63F 13/00; A63F 13/10; A63F 13/75; A63F 13/822
USPC .................................... 463/29, 42
See application file for complete search history.

(56) References Cited

U.S. PATENT DOCUMENTS 8,360,838 B2 * 1/2013 Nguyen ............... G06Q 10/10
  463/29
8,360,865 B2 * 1/2013 Walker ............... G07F 17/3225
  463/25
8,366,553 B2 * 2/2013 Kim ..................... A63F 13/75
  463/29

(Continued)

FOREIGN PATENT DOCUMENTS

JP  2004-180951 A   7/2004
JP  2006-296769 A   11/2006

(Continued)

OTHER PUBLICATIONS

International Search Report issued in PCT/JP2016/064610, dated Aug. 2, 2016 (2 pages).

(Continued)

*Primary Examiner* — Michael A Cuff
(74) *Attorney, Agent, or Firm* — Osha Liang LLP

(57) ABSTRACT

A history-information obtaining unit obtains operation history information from a plurality of player terminals. A feature-information generating unit generates, for each of a plurality of players, feature information representing a feature of operation in the form of a certain weighted value obtained from the operation history information. A clustering unit clusters the plurality of players on the basis of the individual feature information of the plurality of players. An other-player-information sending control unit executes control so as to send information about other players belonging to the same group to the individual player terminals of the clustered plurality of players, while prohibiting sending of information about other players belonging to other groups.

10 Claims, 11 Drawing Sheets

(56) References Cited

U.S. PATENT DOCUMENTS

| | | | |
|---|---|---|---|
| 8,376,855 B2* | 2/2013 | Lockton | A63F 13/332 |
| | | | 463/40 |
| 2003/0216962 A1* | 11/2003 | Heller | A63F 13/12 |
| | | | 705/318 |
| 2009/0276062 A1* | 11/2009 | Kanai | A61B 5/16 |
| | | | 700/45 |
| 2010/0162405 A1* | 6/2010 | Cook | G06F 21/552 |
| | | | 726/26 |
| 2014/0243077 A1 | 8/2014 | Choi | |
| 2016/0142774 A1* | 5/2016 | Sayyadi-Harikandehei | |
| | | | H04N 21/4668 |
| | | | 725/14 |

FOREIGN PATENT DOCUMENTS

| | | |
|---|---|---|
| JP | 2007-058494 A | 3/2007 |
| JP | 2010-167169 A | 8/2010 |

OTHER PUBLICATIONS

Written Opinion issued in PCT/JP2016/064610, dated Aug. 2, 2016 (4 pages).
Notice of Reasons for Rejection issued in corresponding JP Application No. 2015-102894, dated Jan. 12, 2016 (3 pages).

* cited by examiner

INFORMATION PROCESSING SYSTEM, SERVER, AND PROGRAM

TECHNICAL FIELD

The present invention relates to information processing systems, servers, and programs.

BACKGROUND ART

As games that can be executed on terminals such as smartphones, games in which a plurality of players can participate, such as multi-battle games, have existed in the past (e.g., see Patent Literature 1).

Such games suffer from the problem of the presence of players conducting acts of tampering with game data, such as acts of abnormally enhancing the level or status, acts of modifying graphics, and acts of acquiring rare items. Hereinafter, acts of illegitimately attempting to gain an advantage in proceeding with a game by exhibiting actions not intended by a game administrator, including the above acts of tampering with game data, will be broadly referred to as "cheating". An act of illegitimate data communication is an example of cheating. Furthermore, a player who conducts such cheating will be referred to as a "cheater".

Thus, anti-cheat software has been provided in the past. The existing anti-cheat software detects only kinds of cheating that can reliably be distinguished as cheating.

Furthermore, Patent Literature 1 discloses a technology for grouping players suspected as cheaters.

Patent Literature 1: Japanese Unexamined Patent Application, Publication No. 2006-296769

DISCLOSURE OF THE INVENTION

Problems to be Solved by the Invention

With the recently increasing variety and complexity in cheating methods, however, many cheating acts that cannot be dealt with by the technology described in Patent Literature 1 or the existing anti-cheat software are being conducted. Furthermore, cheating methods that had been unknown have been emerging one after another. Therefore, in the case where cheating is conducted by using an unknown cheating method or a cheating method that is difficult to detect, particularly in the case where there is a rapid increase in such cheating, there is a demand for game administrators to immediately deal with such cheating in order to protect ordinary players who do not conduct cheating. Specifically, as immediate measures, there is a demand for isolating cheaters using an unknown cheating method or a cheating method that is difficult to detect such that those cheaters become invisible to ordinary players and for issuing an alarm to the game administrator about the emergence of the cheaters.

The present invention has been made in view of the situation described above, and it is an object thereof to establish a technology that makes it possible to immediately deal with cheating conducted by using an unknown cheating method or a cheating method that is difficult to detect. Specifically, it is an object thereof to establish a technology that makes it possible, as immediate measures, to isolate cheaters using an unknown cheating method or a cheating method that is difficult to detect such that those cheaters become invisible to ordinary players and to issue an alarm to the game administrator about the emergence of the cheaters.

Means for Solving the Problems

In order to achieve the above object, an information processing system according to an aspect of the present invention is: An information processing system including a plurality of terminals that are capable of accepting individual operations by a plurality of players and executing a game and also including a server, wherein the server includes: history-information obtaining means for executing, for each of the plurality of players, processing for obtaining operation history information of a particular player during execution of the game from a terminal of the particular player; and feature-information generating means for generating, for each of the plurality of players, feature information representing a feature of operations performed by the particular player in the form of a certain weighted value obtained from the operation history information of the particular player, and wherein the feature-information generating means includes: first weight control means for executing control so as to increase a weighted value for the particular player when an operation tendency of the particular player has become peculiar in relation to an operation tendency of a set of players including at least some of the plurality of players; second weight control means for controlling the weighted value of the particular player in accordance with the time elapsed since an operation time-point of the particular player; and weighting calculation means for generating the feature information for each of the plurality of players by calculating the weighted value for each of the plurality of players on the basis of the results of control by the first weight control means and the second weight control means.

A server according to an aspect of the present invention is: A server that carries out communications individually with a plurality of terminals that are capable of accepting individual operations by a plurality of players and executing a game, the server including: history-information obtaining means for executing, for each of the plurality of players, processing for obtaining operation history information of a particular player during execution of the game from a terminal of the particular player; and feature-information generating means for generating, for each of the plurality of players, feature information representing a feature of operations performed by the particular player in the form of a certain weighted value obtained from the operation history information of the particular player, and wherein the feature-information generating means includes: first weight control means for executing control so as to increase a weighted value for the particular player when an operation tendency of the particular player has become peculiar in relation to an operation tendency of a set of players including at least some of the plurality of players; second weight control means for controlling the weighted value of the particular player in accordance with the time elapsed since an operation time-point of the particular player; and weighting calculation means for generating the feature information for each of the plurality of players by calculating the weighted value for each of the plurality of players on the basis of the results of control by the first weight control means and the second weight control means.

A program according to an aspect of the present invention is a program corresponding to the server according to the above aspect of the present invention.

Effects of the Invention

According to the present invention, it is possible to establish a technology that makes it possible to immediately deal with cheating conducted by using an unknown cheating method or a cheating method that is difficult to detect.

PREFERRED MODE FOR CARRYING OUT THE INVENTION

An embodiment of the present invention will be described below with reference to the drawings.

It is to be understood that what are simply referred to as "images" hereinafter should be construed to include both "moving images" and "still images". Furthermore, "moving images" should be construed to include images that are displayed individually through the following first processing to third processing. First processing refers to processing for displaying a series of still images, while continuously switching among them as time passes, for individual actions of objects (e.g., game characters) in planar images (2D images). Specifically, two-dimensional animation, i.e., processing similar to what is called book flipping, is an example of first processing. Second processing refers to processing for presetting motions corresponding to individual actions of objects (e.g., game characters) in stereoscopic images (images based on 3D models) and displaying the objects while changing the motions as time passes. Specifically, three-dimensional animation is an example of second processing.

Third processing refers to processing for preparing videos (i.e., moving images) corresponding to individual actions of objects (e.g., game characters) and rendering the videos as time passes.

Figure 1:
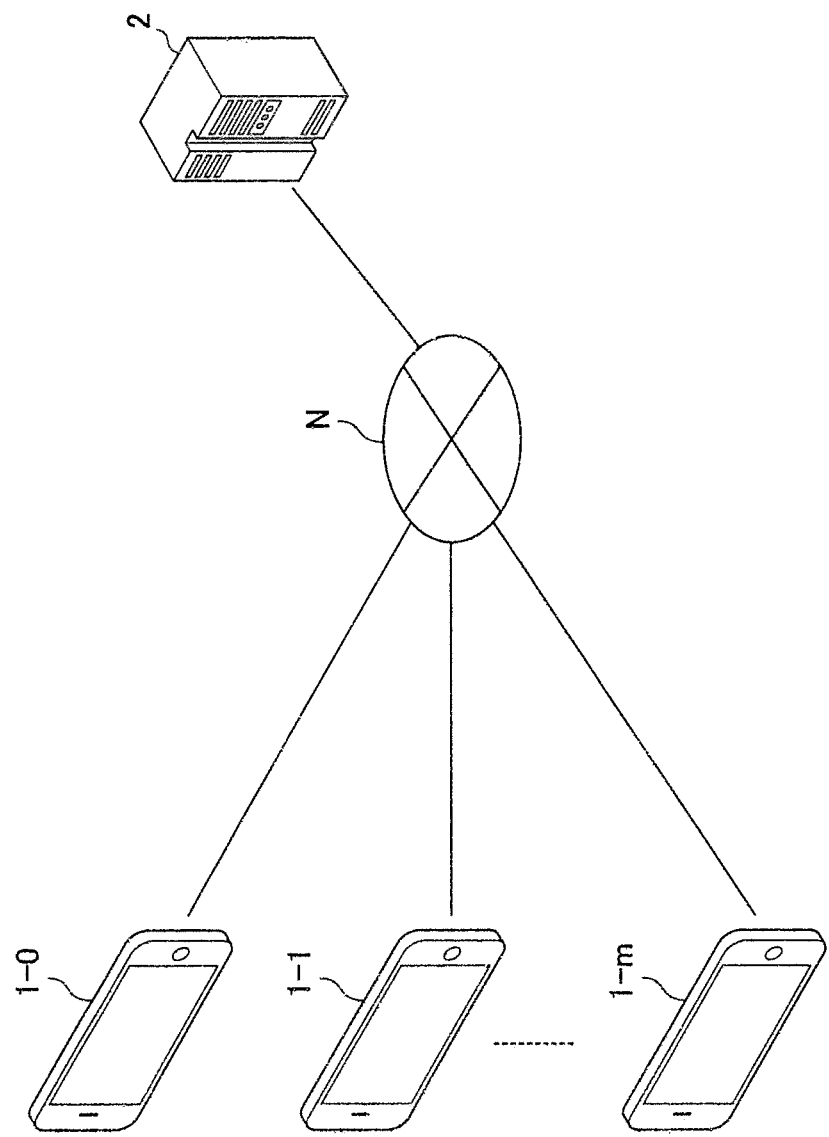
FIG. 1 is a block diagram showing the configuration of an information processing system according to an embodiment of the present invention.

FIG. 1 shows the configuration of an information processing system according to an embodiment of the present invention. The information processing system shown in FIG. 1 is a system including player terminals 1-0 to 1-$m$ individually used by m+1 players (m is an arbitrary integer greater than or equal to 1) and also including a server 2. The individual player terminals 1-0 to 1-$m$ and the server 2 are connected to each other via a predetermined network N, such as the Internet.

The server 2 provides the individual player terminals 1-0 to 1-$m$ with a game execution environment to provide various services relating to a game that is executed at the individual player terminals 1-0 to 1-$m$.

Hereinafter, in the case where there is no need for distinction among the individual player terminals 1-0 to 1-$m$, these will be referred to collectively as "player terminals 1".

Figure 2:
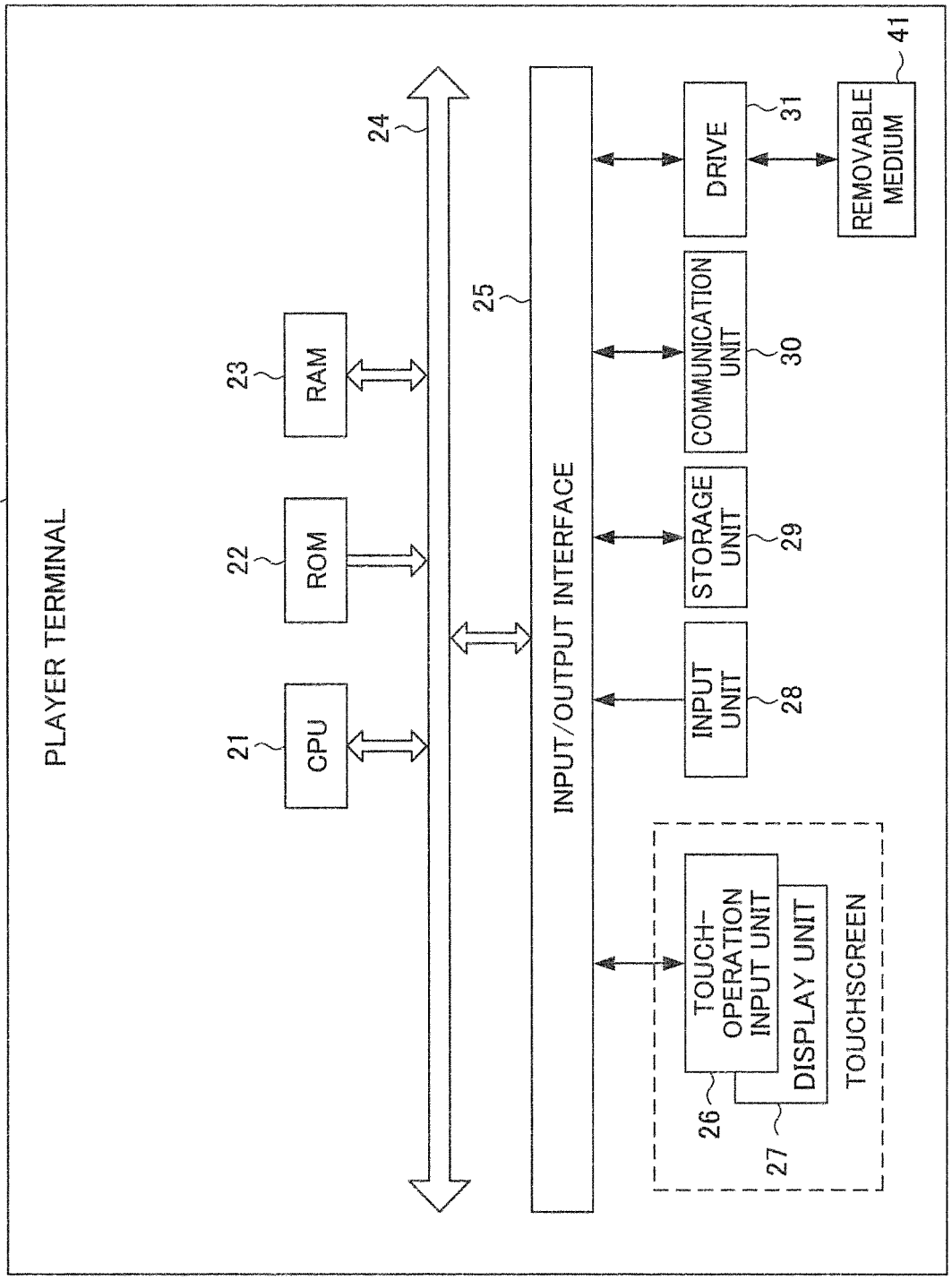
FIG. 2 is a block diagram showing, in the information processing system in FIG. 1, the hardware configuration of a player terminal as an embodiment of a terminal according to the present invention.

FIG. 2 is a block diagram showing, in the information processing system in FIG. 1, the hardware configuration of a player terminal 1 as an embodiment of a terminal according to the present invention.

The player terminal 1 is implemented by a smartphone or the like. The player terminal 1 includes a CPU (Central Processing Unit) 21, a ROM (Read Only Memory) 22, a RAM (Random Access Memory) 23, a bus 24, an input/output interface 25, a touch-operation input unit 26, a display unit 27, an input unit 28, a storage unit 29, a communication unit 30, and a drive 31.

The CPU 21 executes various kinds of processing according to programs recorded in the ROM 22 or programs loaded from the storage unit 29 into the RAM 23. The RAM 23 also stores, as appropriate, data, etc. that are needed when the CPU 21 executes various kinds of processing.

The CPU 21, the ROM 22, and the RAM 23 are connected to each other via the bus 24. The input/output interface 25 is also connected to the bus 24. The touch-operation input unit 26, the display unit 27, the input unit 28, the storage unit 29, the communication unit 30, and the drive 31 are connected to the input/output interface 25.

The touch-operation input unit 26 is constituted of, for example, capacitive or resistive (pressure-sensitive) position input sensors that are laid over the display surface of the display unit 27, which detect the coordinates of a position at which a touch operation is performed. The touch operation here refers to bringing something into contact with or in proximity to the touch-operation input unit 26. What is brought into contact with or in proximity to the touch-operation input unit 26 is, for example, a player's finger or a stylus. Hereinafter, a position at which a touch operation is performed will be referred to as a "touched position", and the coordinates of the touched position will be referred to as "touched coordinates". The display unit 17 is implemented by a display, such as a liquid crystal display, and displays various kinds of images, such as images related to the game. As described above, in this embodiment, a touchscreen is constituted of the touch-operation input unit 26 and the display unit 27.

The input unit 28 is constituted of various kinds of hardware buttons, etc. and allows input of various kinds of information in accordance with instruction operations performed by the player. The storage unit 29 is implemented by a DRAM (Dynamic Random Access Memory) or the like and stores various kinds of data. The communication unit 30 controls communications carried out with other devices (the server 2 and the other player terminals 1 in the example in FIG. 1) via the network N, including the Internet.

The drive 31 is provided as needed. A removable medium 41 implemented by a magnetic disk, an optical disk, a magneto-optical disk, a semiconductor memory, or the like is loaded in the drive 31 as appropriate. A program read from the removable medium 41 by the drive 31 is installed in the storage unit 29 as needed. The removable medium 41 can also store various kinds of data stored in the storage unit 29, similarly to the storage unit 29.

Figure 3:
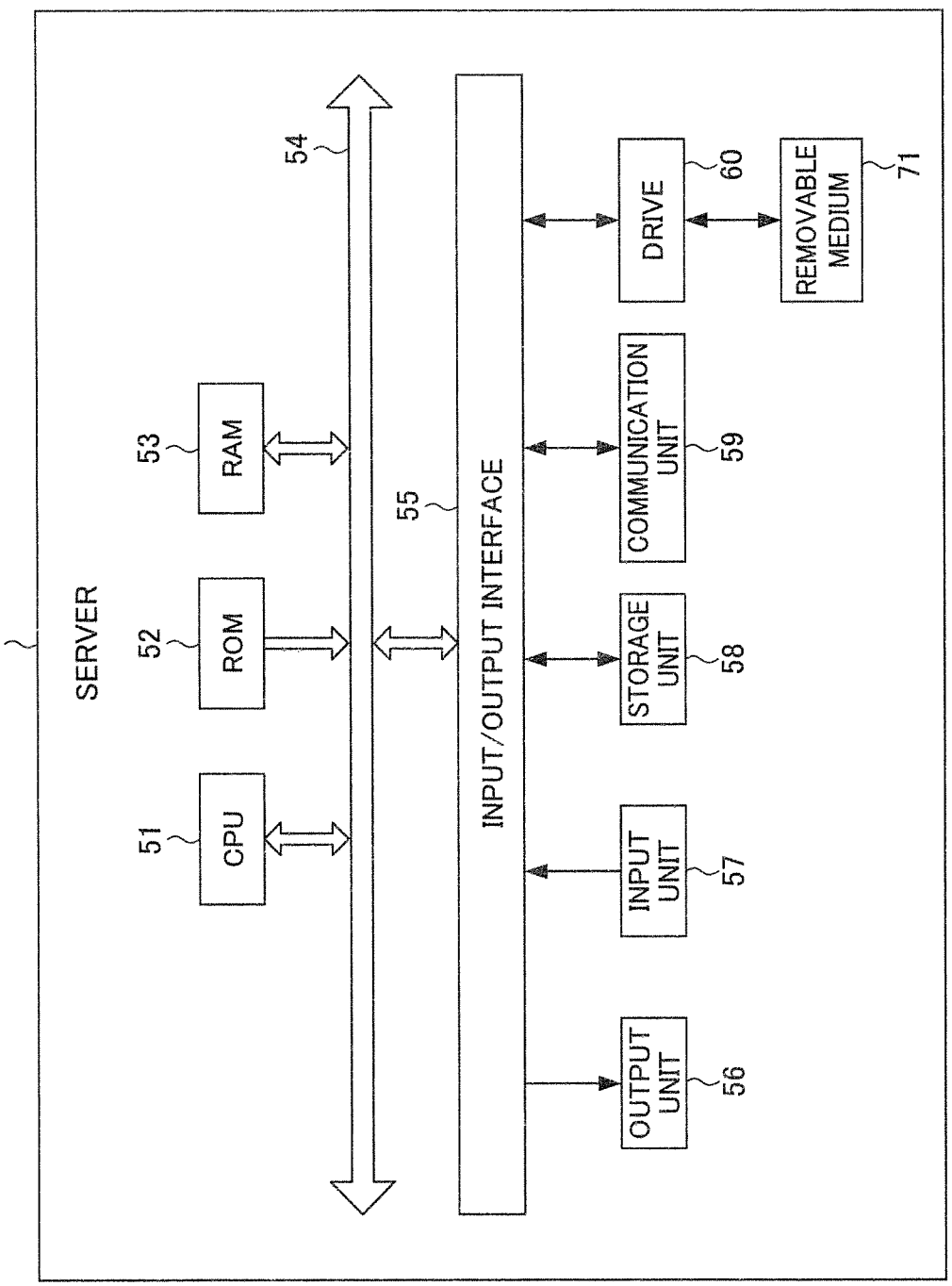
FIG. 3 is a block diagram showing, in the information processing system in FIG. 1, the hardware configuration of a server according to an embodiment of the present invention.

FIG. 3 is a block diagram showing, in the information processing system in FIG. 1, the hardware configuration of the server 2 according to an embodiment of the present invention.

The server 2 includes a CPU 51, a ROM 52, a RAM 53, a bus 54, an input/output interface 55, an output unit 56, an input unit 57, a storage unit 58, a communication unit 59, and a drive 60. Since the configuration of the server 2 is basically the same as that of the player terminal 1 with the touchscreen thereof removed, a description thereof will be omitted here.

Through cooperation between the various kinds of hardware and various kinds of software in the player terminal 1 in FIG. 2 and the server 2 in FIG. 3, it becomes possible to execute a game on the player terminal 1. This embodiment is directed to a game in which a plurality of players participate, such as a multi-battle game. Thus, the information processing system according to this embodiment can execute various kinds of control for the game. In particular, the information processing system can execute the following control as control for suppressing the emergence of cheaters in the game (hereinafter referred to as "cheat suppression control").

Specifically, most cheaters conduct cheating by using a program or the like that enables cheating in a game (hereinafter referred to as a "cheating tool"). Thus, the operation data of players using the same cheating tool commonly involve behavior specific to that cheating tool. That is, players using the same cheating tool have similar operation tendencies in a game. Here, operation tendencies refer to tendencies obtained from history information about operations performed by a player in relation to various kinds of situations involving operations, such as certain events, and indicating features of the player about the methods and kinds of operations. Thus, the inventor of the present invention invented the cheat suppression control in view of the point that "players using the same cheating tool have similar operation tendencies in a game."

Specifically, with cheat suppression control, players are grouped in accordance with the similarity of operation data, and the permitted range of information reference among players is restricted to those within the same group. The permitted range of information reference among players refers to a range in which a player is allowed to view information about other players or to cooperate with other players in a game.

Figure 4:
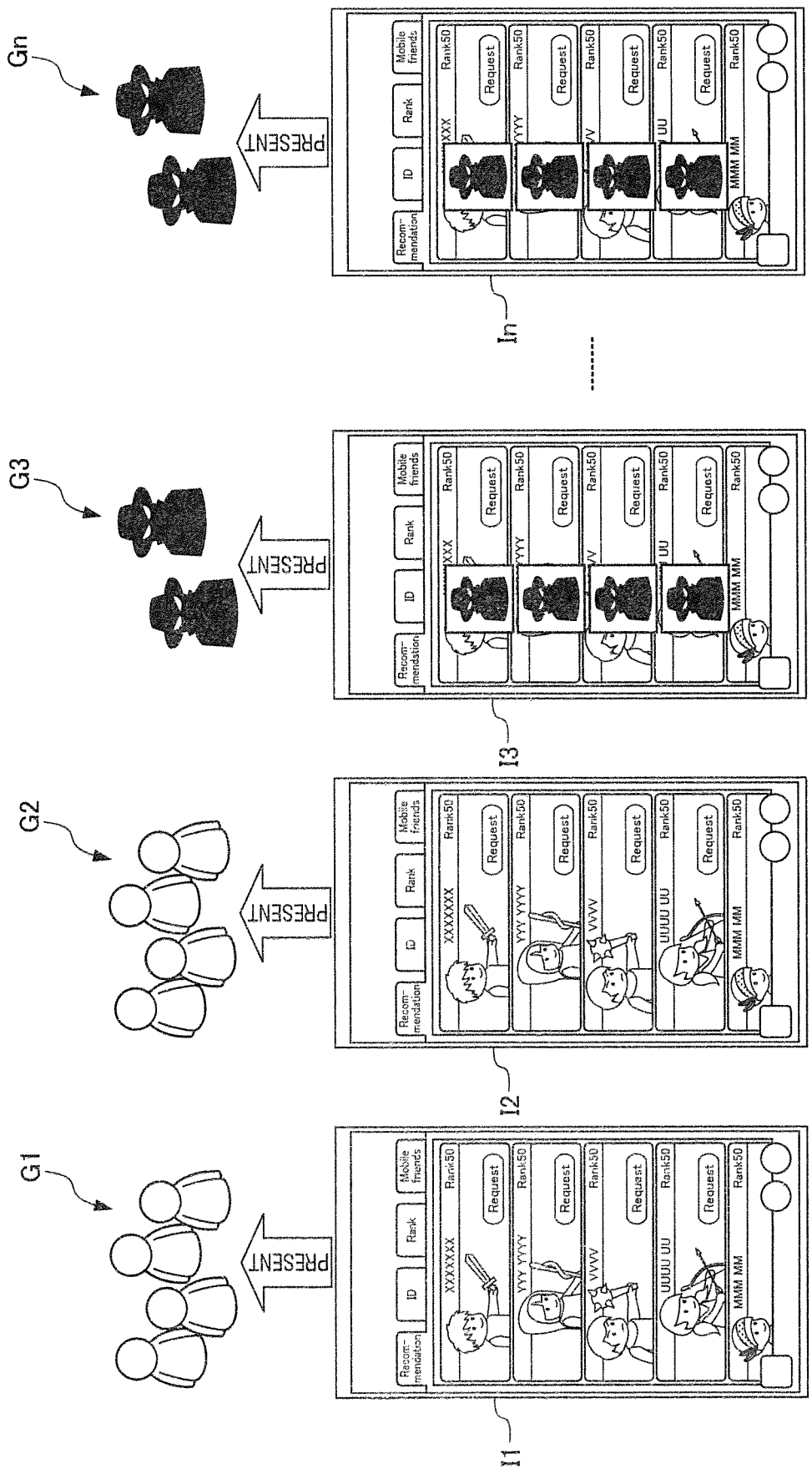
FIG. 4 is a schematic illustration showing an example of the results of cheat suppression control executed by the server in FIG. 3.

The cheat suppression control will be further described below with reference to FIGS. 4 and 5. FIG. 4 is a schematic illustration showing an example of the result of the cheat suppression control. In the example in FIG. 4, as a result of executing the cheat suppression control, n (n is an arbitrary integer greater than or equal to 4 in the example in FIG. 4) groups G1 to Gn are generated.

Groups G1 and G2 are groups to which ordinary players who do not conduct cheating belong. The distinction between groups G1 and G2 comes from whether the operation tendencies are similar. That is, players belonging to group G1 have similar operation tendencies to other players belonging to the same group G1 and do not have similar operation tendencies to other players belonging to other groups, including group G2. On the other hand, players belonging to group G2 have similar operation tendencies to other players belonging to the same group G2 and do not have similar operation tendencies to other players belonging to other groups, including group G1.

Group G3 is a group into which players using the same cheating tool are classified. Specifically, as described above, the operation data sent to the server 2 from the player terminals 1 using a certain cheating tool exhibit operation tendencies specific to that certain cheating tool. The operation tendencies are commonly observed among a plurality of players using the certain cheating tool. Thus, group G3 to which the plurality of players using the certain cheating tool belong is automatically generated.

Group Gn is also a group into which players using the same cheating tool are classified. The distinction between groups G3 and Gn comes from whether the operation tendencies are similar. That is, group G3 is constituted of players using a first cheating tool, and group Gn is constituted of players using a second cheating tool that differs from the first cheating tool.

As shown in FIG. 4, on the player terminal 1 of a player belonging to group Gk (k is an arbitrary integer from 1 to n), as a screen that allows the player to view information about other players or to cooperate with other players in the game, a screen Ik in which the other players are restricted to players belonging to the same group Gk is displayed.

That is, only other players using the first cheating tool appear in a screen 13. In other words, cheaters using the first cheating tool are allowed to cooperate with only other players using the same first cheating tool (who are cheaters in most cases) and are automatically isolated from ordinary players belonging to groups G1 and G2. Thus, cheaters using the first cheating tool can cooperate only with other players having similar operation tendencies, i.e., other cheaters having obviously abnormal operation tendencies due to cheating. Therefore, the cheaters using the first cheating tool will recognize that the service provider (the game administrator or the like) is detecting cheating actions. As a result, it is expected that the cheaters will quit cheating. This serves to suppress cheating itself.

Furthermore, with the information processing system according to this embodiment, since it is possible to automatically group players having similar operation tendencies, as described above, there is no particular need to perform learning in advance for grouping. Accordingly, for example, even if the second cheating tool is an unknown cheating tool, players using the second cheating tool are automatically classified into group Gn. Also in this case, the same as group G3, cheaters using the second cheating tool can cooperate only with other players having similar operation tendencies, i.e., other cheaters having obviously abnormal operation tendencies due to cheating. Therefore, the cheaters using the second cheating tool will recognize that the service provider is detecting cheating actions. As a result, it is expected that the cheaters will quit cheating. In this way, even in the case where the unknown second cheating tool emerges, it is possible to automatically suppress cheating itself.

Figure 5:
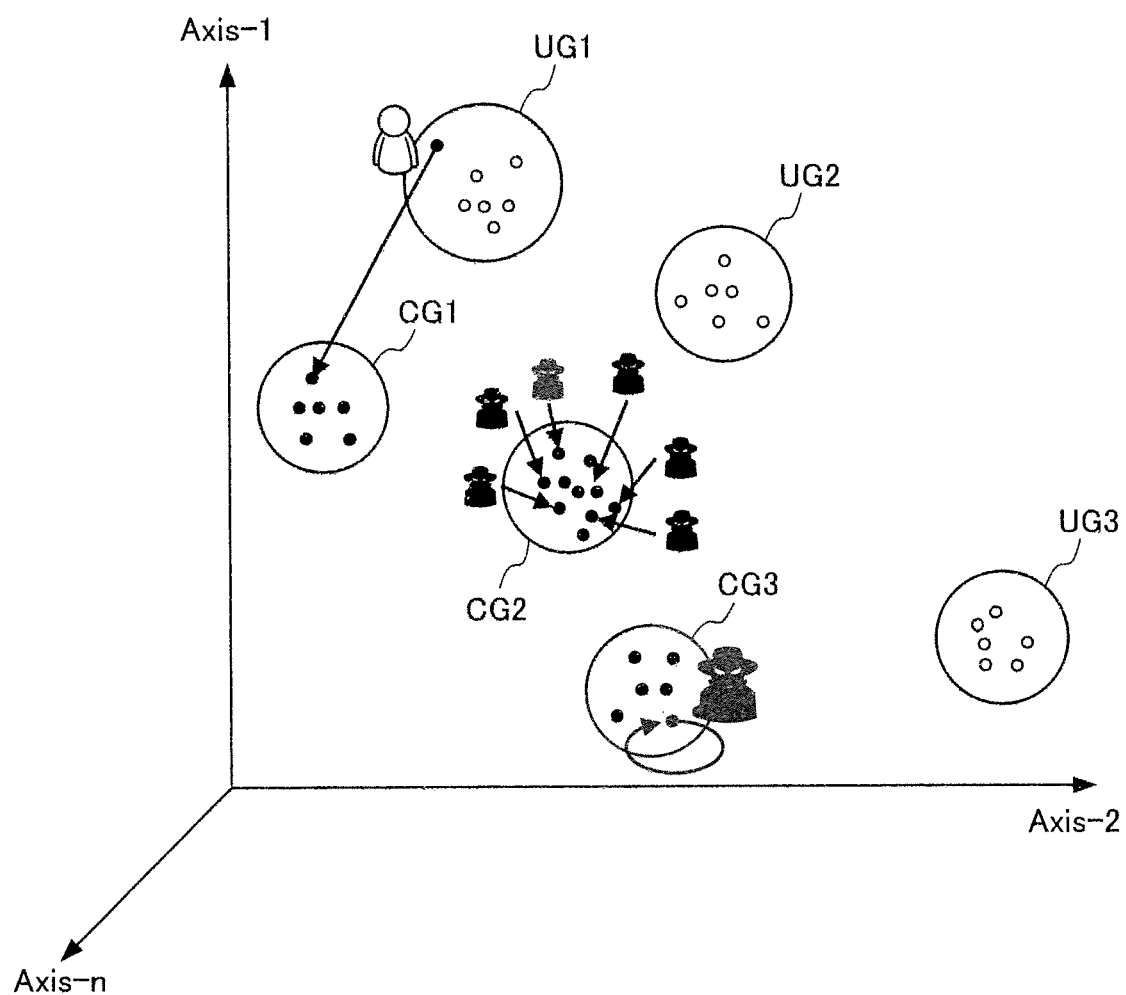
FIG. 5 is a schematic illustration for explaining grouping that is executed when the cheat suppression control is executed.

FIG. 5 is a schematic illustration for explaining grouping that is performed when executing the cheat suppression control. In the cheat suppression control, grouping is performed in the form of clustering among players. In order to realize this clustering, in this embodiment, each player is represented as a vector in a multi-dimensional vector space (a three-dimensional vector space in the example in FIG. 5 for convenience of explanation). That is, the server 2 calculates the similarity between the operation tendencies of a player and the operation tendencies of another player in the form of a distance in the multi-dimensional vector space. For example, suppose that a game involves n+1 kinds (n is an arbitrary integer) of command. In this case, the server 2 constructs an n+1-dimensional vector space having axes corresponding to the individual kinds of command and locates vectors for the individual players in the vector space. The number of elements n+1 of the vector for each player may be on the order of hundreds to thousands, depending on the nature of the game. For example, in the case where a game involves 1000 kinds of command, a vector formed of 1000 elements is calculated as a vector for each player. The vector space and the vector for each player can be changed in accordance with the game title. That is, the cheat suppression control is applicable to arbitrary game genres that now exist or that may emerge in the future; for example, as for existing game genres, the cheat suppression control is applicable to a wide range of game genres, such as RPGs, action RPGs, and simulation games.

In the example in FIG. 5, for convenience of explanation, a three-dimensional vector space is constructed, and vectors for the individual players are represented as black dots in the vector space. In this vector space, each group is generated from dots that are near to each other. In the example in FIG. 5, groups UG1, UG2, and UG3 are generated as groups to which ordinary players who do not conduct cheating actions, etc. belong. Furthermore, groups CG1, CG2, and CG3 are generated as groups to which cheaters belong.

With the cheat suppression control according to this embodiment, instead of fixing clusters (groups) when such clustering is performed once, clustering is repeated as time passes, and clusters change each time. That is, players belonging to the individual clusters may change in real time. As a result of performing such clustering in real time, when the number of players having similarity in particular operation tendencies suddenly increases, the group to which the players belong (e.g., group CG2 in FIG. 5) suddenly expands. Thus, it is possible to grasp the possibility of the emergence of an unknown cheating method on the basis of a change in the cluster size. That is, in the case where group CG2 in FIG. 5 suddenly emerges or suddenly expands, it is possible to readily determine that there is a high possibility that the players belonging to group CG2 are conducting cheating by using an unknown cheating method. As described above, the clustering method used in the cheat suppression control according to this embodiment is a unique method that has not exited before. Thus, the clustering method will be referred to particularly as "responsive clustering (clustering that is responsive to changes in situations)", as opposed to existing methods.

In order to realize "responsive clustering", in this embodiment, a method of generating feature quantities (metadata) for each player is adopted. Here, since the feature quantities are represented as a vector in this embodiment, as described above, such a vector will hereinafter be referred to as a "metadata vector". Specifically, the server 2 in this embodiment generates metadata vectors representing features of the individual players from logs of operation data in order to enable calculation of the similarity between operation data among the players.

As will be described later in detail, when generating metadata vectors, the server 2 executes weighting control (hereinafter referred to as "first weighting control") such that lower levels of importance are assigned to actions that are common to all players and such that higher levels of importance are assigned to actions that are common to only a small number of players. The first weighting control serves to more suitably extract behavior, i.e., operation tendencies, that are specific to a cheating tool.

Furthermore, the server 2 executes weighting control (hereinafter referred to as "second weighting control") such that higher weights are assigned to recent operation data and such that lower weights are assigned to past operation data. By using values that are weighted by the first weighting control and the second weighting control described above (weighted values), the following advantages are afforded. For example, in the case where an ordinary player who is not a cheater happens to temporarily use a cheating tool or conduct an action suspected of being cheating (an action similar to cheating), the player is immediately moved from ordinary group UG1 to cheater group CG1, as shown in FIG. 5. In this case, on the player terminal 1 of the player, a screen such as screen 13 or screen In in FIG. 4 is displayed. Therefore, the player can immediately recognize that other players that the player is allowed to view information about or cooperate with are only cheaters, and thus the player can immediately quit (if the player intends to quit) cheating or an action suspected of being cheating. In this case, the player can return from cheater group CG1 to ordinary group UG1 after a certain period. Meanwhile, although lower weights are assigned to past operation data with the second weighting control, weighted values in which history information about operation data involving a cheating tool cumulatively works are obtained. Thus, a habitual cheater cannot get out of a cheater group (group CG3 in the example in FIG. 5) by quitting the use of the cheating tool just for a short period.

Figure 6:
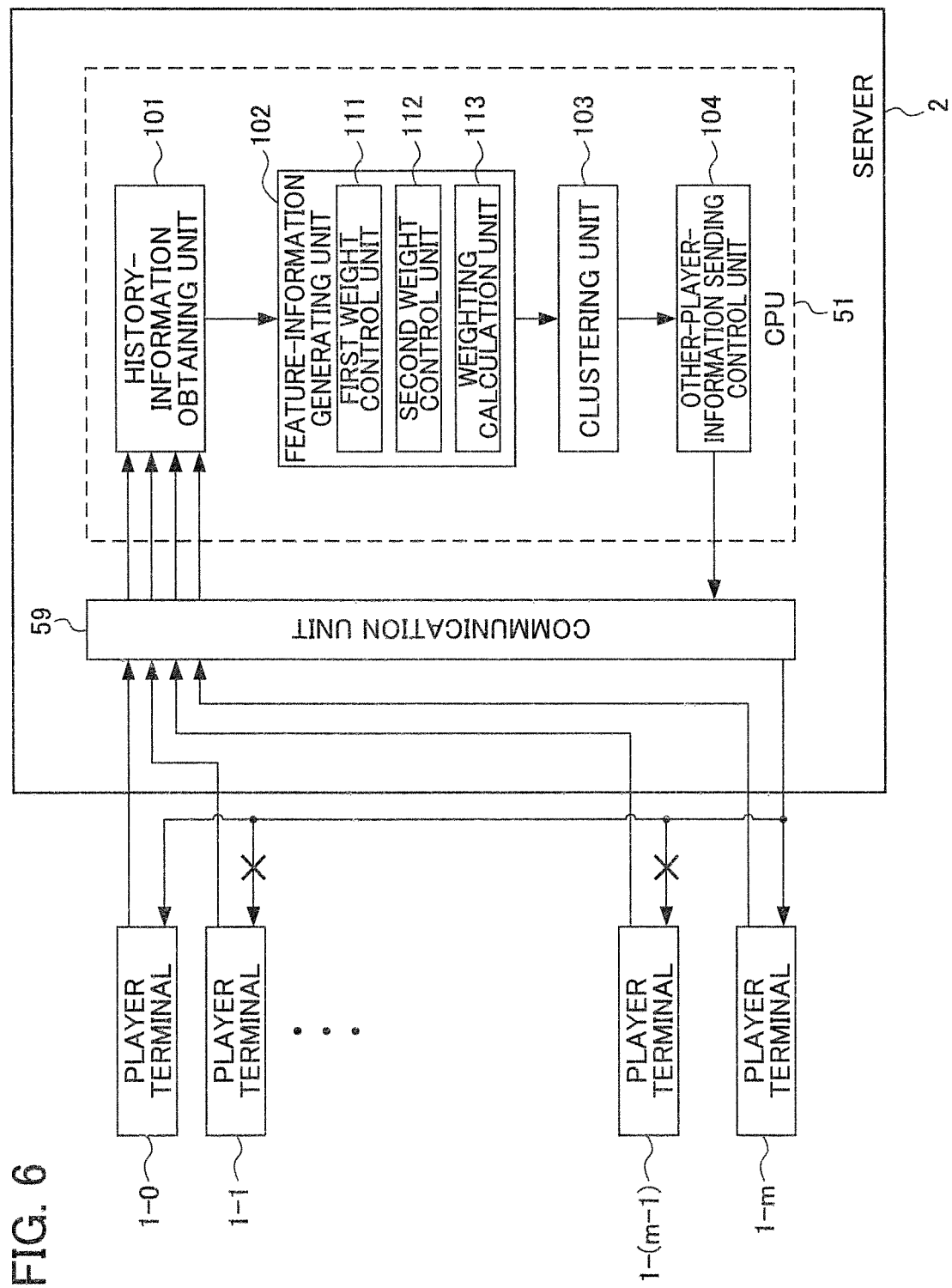
FIG. 6 is a functional block diagram showing an example of the functional configuration of the server in FIG. 3.

In order to execute the cheat suppression control described above, the server 2 has a functional configuration shown in FIG. 6.

As shown in FIG. 6, the CPU 51 of the server 2 has functions for a history-information obtaining unit 101, a feature-information generating unit 102, a clustering unit 103, and an other-player-information sending control unit 104. The feature-information generating unit 102 has functions for a first weight control unit 111, a second weight control unit 112, and a weighting calculation unit 113.

The history-information obtaining unit 101 executes processing for obtaining history information about operations performed by a particular player during the execution of a certain game from the player terminal 1 of the particular player, for each of a plurality of players. That is, the history-information obtaining unit 101 obtains operation history information from each of the player terminals 1-0 to 1-m.

The feature-information generates feature information representing features of operations performed by a particular player in the form of certain weighted values obtained from the history information about the operations performed by the particular player, for each of a plurality of players. Here, the feature information in this embodiment refers to the metadata vector described earlier, and a specific example of the feature information will be described later with reference to FIG. 7, etc.

Specifically, the first weight control unit 111 executes the first weighting control described earlier. That is, the first weight control unit 111 executes control such that the weighted values for a particular player become greater when the operation tendencies of the particular player have become peculiar in relation to the operation tendencies of a group including at least some of the plurality of players. The second weight control unit 112 executes the second weighting control described earlier. That is, the second weight control unit 112 controls the weighted values for a particular player in accordance with the elapse of time from the operation time-point of the particular player. The operation time-point of the particular player refers to the timing of an operation performed for the first time by the particular player with respect to a preset timing, such as the timing when the certain game is activated for the first time after registration. The weighting calculation unit 113 calculates the weighted values for each of the plurality of players on the basis of the results of control by the first weight control unit 111 and the second weight control unit 112 to generate feature information (a metadata vector) for each of the plurality of players.

The clustering unit 103 clusters the plurality of players on the basis of the feature information (metadata vectors) for the plurality of players. The other-player-information sending control unit 104 executes control so as to send information about other players belonging to the same group to the individual player terminals 1-0 to 1-*m* of the plurality of players clustered by the clustering unit 103, while prohibiting sending of information about other players belonging to other groups. Here, information about other players refers to information that allows a player to view information about other players or to cooperate with other players in the game and that can be displayed as screens (screens I1 to Im in the example in FIG. 4) on the player terminal 1. In the example in FIG. 6, the player terminals 1-0 and 1-*m* belong to a certain group, and thus information about other players belonging to the same group is sent to the player terminals 1-0 and 1-*m*, while prohibiting sending of the information to the other player terminals 1-1 to 1-(*m*−1).

Now, the functional configuration of the server 2 that can execute the cheat suppression control will be described with reference to FIGS. 7 to 11.

Figure 7:
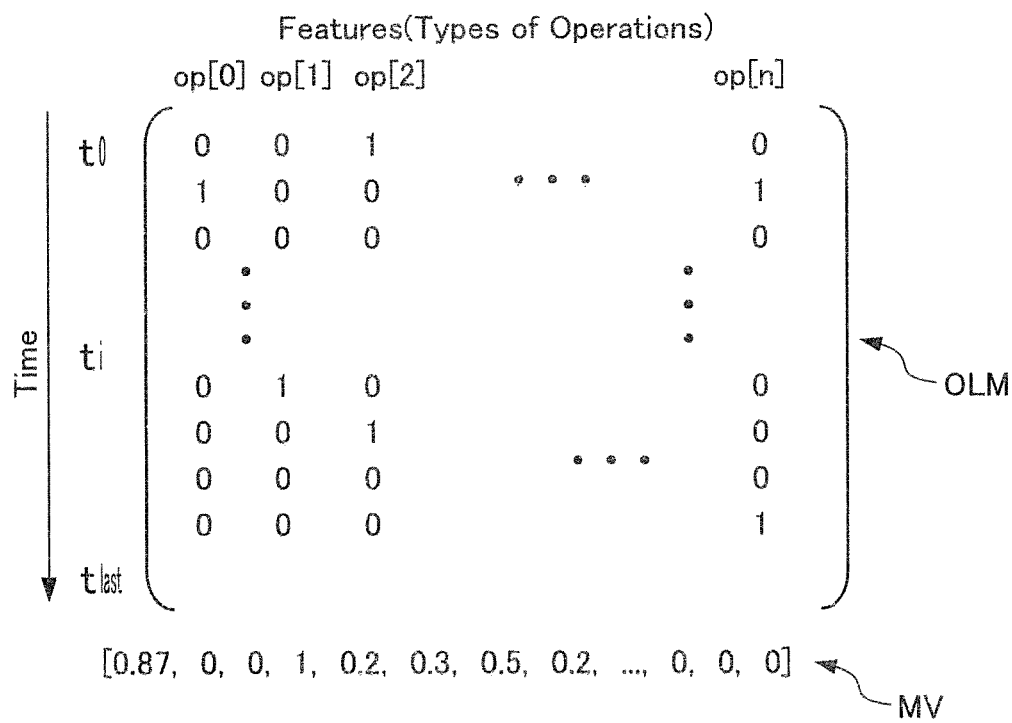
FIG. 7 shows an example of the structures of operation history information and feature information (metadata vector) used in the cheat suppression control executed by the server having the functional configuration in FIG. 6.

FIG. 7 shows an example of the structures of operation history information and feature information (metadata vector). In the example in FIG. 7, the data structure of the operation history information of a particular player is a matrix structure. Such a matrix representing the operation history information of a particular player will herein be referred to particularly as an "OLM (operation log matrix)".

Each column (horizontal axis) represents operation records of the particular player about each kind of operation in the game. In this example, assuming that there are n+1 (n is an arbitrary integer) kinds of operation in the game, elements op[0] to op[n] representing operation records for the n+1 kinds exist. In this embodiment, it is assumed that, in each of the elements op[0] to op[n], "1" is stored when the corresponding kind of operation was performed, and "0" is stored when the corresponding kind of operation was not performed. However, this is just an example, and for example, real values obtained according to a predetermined algorithm, such as "0.5", may be stored.

Each row (vertical axis) represents the timing for obtaining operation history information of the particular player. In this example, as time passes, operation history information is obtained at times t1 to tlast at intervals of a predetermined unit. The predetermined unit for the obtainment timing (obtainment intervals) is arbitrary and may be either fixed or variable. For example, the predetermined unit may be a real time unit, such as one second or sixty seconds, or a transaction unit in the game.

Figure 8:
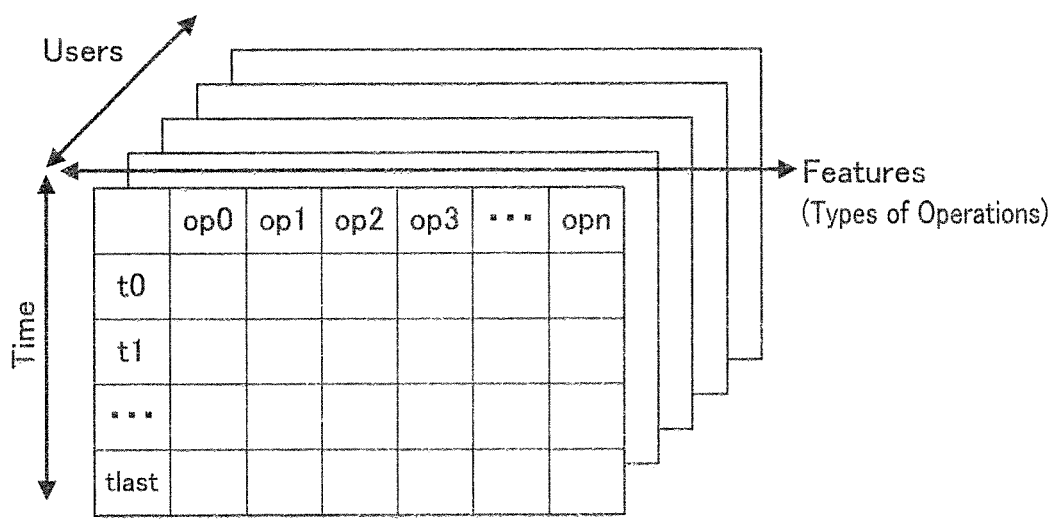
FIG. 8 shows an example of the structure of the history information in FIG. 7, implemented as a three-dimensional array.

On the basis of such an OLM for a particular player, a vector constituted of elements representing weighted values for the individual operations is generated as a metadata vector MV for the particular player. It is to be noted, however, that a metadata vector MV for a particular player is generated by using the OLMs for other players participating in the game as well as the OLM of the particular player. Since one OLM is stored as operation history information for each player, a three-dimensional array is used for implementation in the system as a whole. FIG. 8 shows an example of the structure of operation history information implemented in the form of a three-dimensional array. In this example, since the game is being executed by m+1 player terminals 1-0 to 1-*m*, i.e., m+1 players are participating in the game, operation history information is implemented in the form of a three-dimensional array of m+1 OLMs obtained from the individual player terminals 1-0 to 1-*m*.

The feature-information generating unit 102 generates a metadata vector MV representing operation tendencies for each player on the basis of an OLM implemented as described above. Specifically, as shown in FIG. 7, the feature-information generating unit 102 executes processing for aggregating an OLM into a single vector, i.e., a metadata vector MV.

Figure 9:
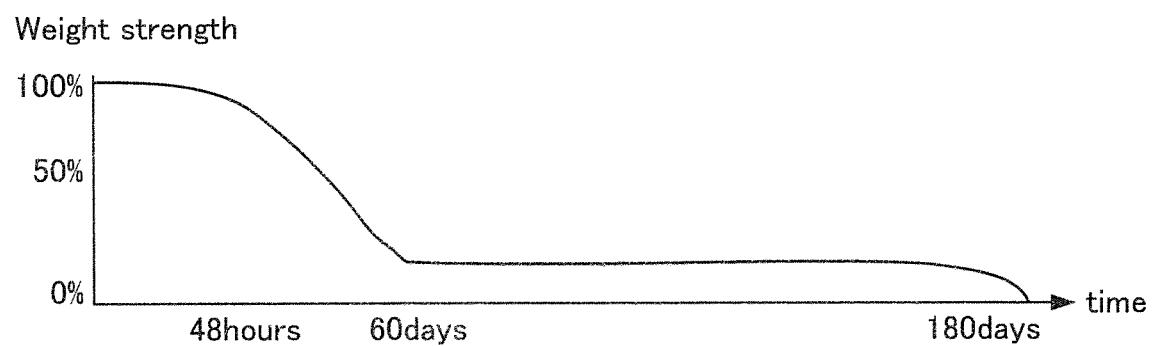
FIG. 9 shows an example of a tweight( ) function used in the cheat suppression control executed by the server having the functional configuration in FIG. 6.

Here, while the aggregation processing is being executed, in accordance with the time elapsed from the operation time-point of a particular player, the second weight control unit 112 controls weights for the individual elements (weighted values) of the metadata MV for the particular player. Here, a function for controlling weights in accordance with the elapse of time will be referred to as a "tweight( ) function". FIG. 9 shows an example of the tweight( ) function. As shown in FIG. 9, the tweight( ) function places emphasis on recently performed operations, and thus weights are increased for more recent operations and weights are decreased as the time goes back in the past. However, the decrease in weights in the tweight( ) function is stopped by a certain period so that the values of operation history information of habitual cheaters will work cumulatively. Furthermore, in order to discard logs that have been stored for a certain period, weights become 0 after an elapse of the certain period (e.g., 180 days in the example in FIG. 9). The tweight( ) function is not particularly limited to the example in FIG. 9, and for example, a function that enables weighting based on shorter periods may be adopted.

The weighting calculation unit 113 of the feature-information generating unit 102 calculates a metadata vector MV for a particular player according to the following equation (1) including the tweight( ) function (the second weighting control by the second weight control unit 112). Although equation (1) also involves the first weighting control by the first weight control unit 111, this restriction will be described later.

[Eq. 1]

$$vec(u) := \left[ \frac{\sum_{i=0}^{last(u)} tweight(d_{[u,i,0]})}{\sum_{j=0}^{m} \sum_{k=0}^{last(j)} d_{[j,k,0]}}, \frac{\sum_{i=0}^{last(u)} tweight(d_{[u,i,1]})}{\sum_{j=0}^{m} \sum_{k=0}^{last(j)} d_{[j,k,1]}}, \ldots, \frac{\sum_{i=0}^{last(u)} tweight(d_{[u,i,n]})}{\sum_{j=0}^{m} \sum_{k=0}^{last(j)} d_{[j,k,n]}} \right] \quad (1)$$

In equation (1), u signifies an ID of a player who is a subject of calculation (hereinafter referred to as a "subject player"). That is, vec(u) signifies a metadata vector MV for the subject player u. last(u) in the numerator of each element signifies the timing of the latest (most recent) obtainment of operation history information for the subject player u. If the OLM shown in FIGS. 7 and 8 is used, last(u)=tlast. That is, i=0 represents the timing of time t0, and i=last(u) represents the timing of time tlast. d[u, i, p] in the numerator of each element signifies the value (score) for the p-th (p is an arbitrary integer from 0 to n) kind of operation corresponding to the i-th (time ti) history information of the subject player u. For example, in the case where the PLM for the subject player u is that shown in FIG. 7, the value "0" stored at the element op[0] at time t0 (the element op[0] at the top left) in the OLM in FIG. 7 is substituted for d[u, 0, 0]. j in the denominator of each element signifies an ID of a player. That is, j=0 to m individually represent the IDs of the individual players who operate the player terminals 1-0 to 1-m. last(j) in the denominator of each element signifies the latest (most recent) timing for obtaining operation history information for a player j. d[j, k, p] in the denominator of each element signifies the value for the p-th kind of operation corresponding to the k-th (time tk) history information of the player j.

Figure 10:
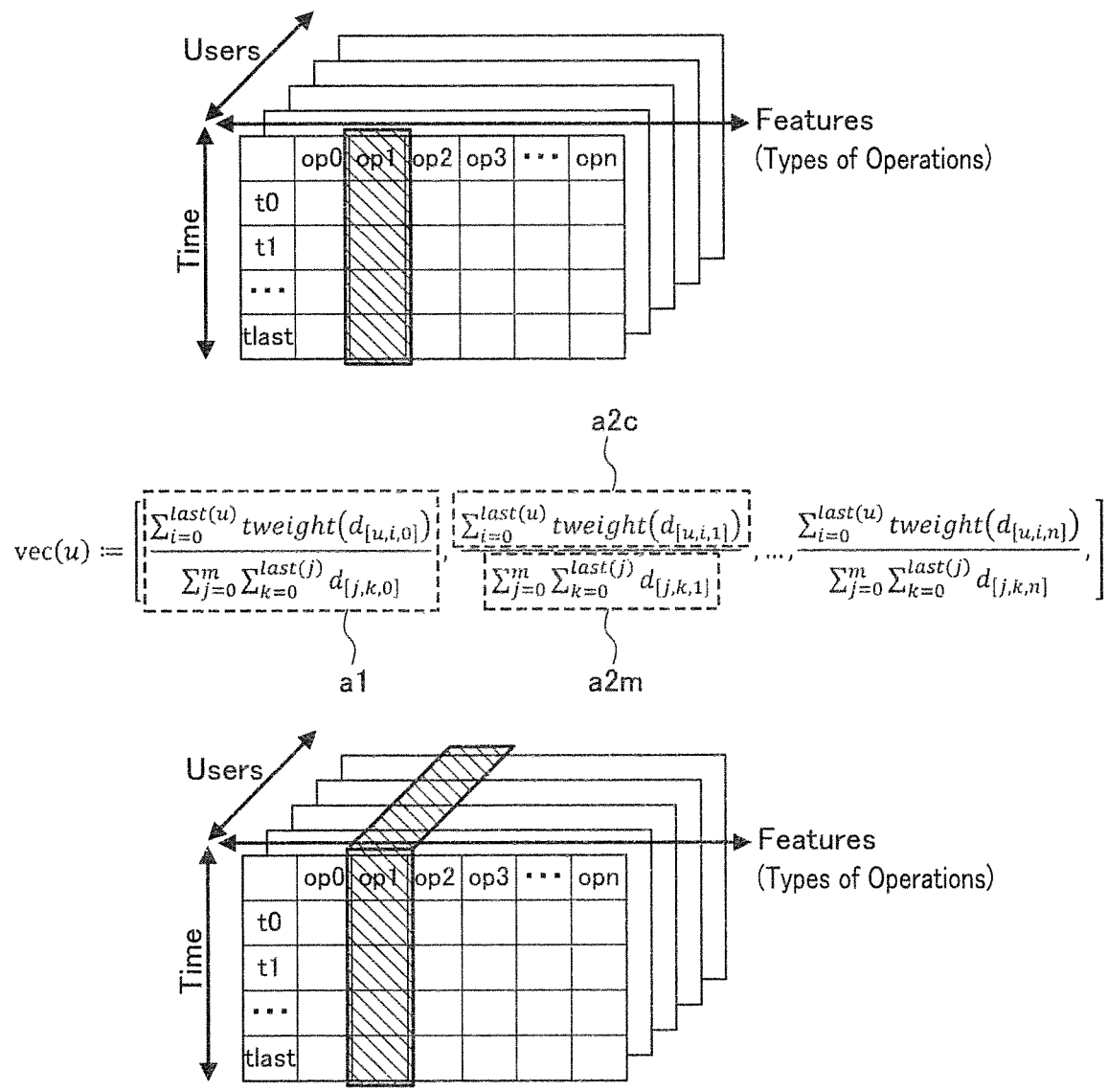
FIG. 10 is a schematic illustration for explaining what is meant by a formula for calculating feature information, used in the cheat suppression control executed by the server having the functional configuration in FIG. 6.

FIG. 10 is a schematic illustration for explaining what is meant by equation (1). In the middle of FIG. 10, the vector vec(u) in equation (1) given above, i.e., a metadata vector MV of the subject player u, is shown. The metadata vector vec(u) is constituted of n+1 elements, such as an element a1. Each element is calculated as a fraction formed of a denominator a2m and a numerator a2c.

The denominator a2m of the p-th element is the sum, for all the m+1 players, of the cumulative values (scores) of the values for the p-th kind of operation (the values stored at the elements op[1] in FIG. 7 in the example in FIG. 10) from time t0 to time tlast. That is, the denominator a2m of the p-th element indicates the "generality" about the values of the p-th kind of operation. The denominator a2m is constituted of two aggregation operations. A first aggregation operation (the right-hand side of the equation) adds together the values in a feature category corresponding to a specific operation performed by each player (the values for the p-th kind of operation), thereby calculating a score. A second aggregation operation (the left-hand side of the equation) adds together the scores of the individual players for all the players.

The numerator a2c accumulates, from time t0 to time tlast, values obtained by weighting the values of operation history information of the subject player u according to the tweight( ) function, and calculates a score for the subject player u.

That is, the weighting calculation unit 113 divides the numerator a2c representing a score (a score weighted in accordance with the elapse of time) for the subject player u by the denominator a2m representing a generality score derived from the sum for all the players, thereby calculating a value of an element (score) indicating whether the subject player u is performing a peculiar operation. In other words, it is understood that this control for dividing the numerator a2c by the denominator a2m is the first weighting control by the first weight control unit 111. That is, as the first weighting control, control is executed to divide the numerator a2c by the denominator a2m such that the weighted values for a particular player increase when the operation tendencies of the particular player (the operation tendencies represented by the numerator a2c for the subject player u) have become peculiar in relation to the operation tendencies of the whole set of players (the operation tendencies represented by the denominator a2m).

Figure 11:
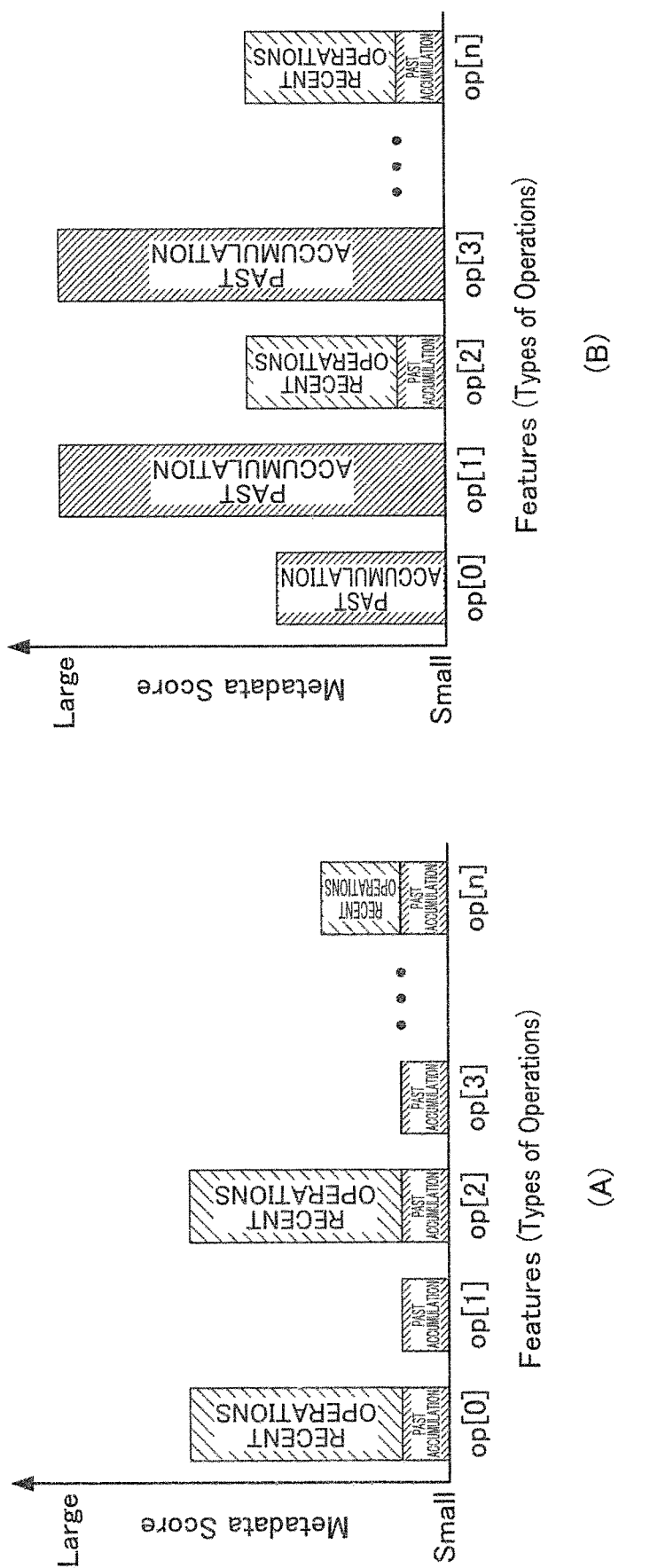
FIG. 11 shows graphs about individual elements of feature information calculated according to the formula in FIG. 10.

FIG. 11 shows graphs representing the individual elements of the metadata vector MV for the subject player u. For example, suppose that, for the certain game, there are generally operation tendencies for performing the zeroth kind of operation and the second kind of operation (tendencies that the values of the elements op[0] and op[2] on each row of the OLM become 1). Furthermore, suppose that there are operation tendencies for performing the first kind of operation and the third kind of operation (tendencies that the values of the elements op[1] and op[3] on each row of the OLM become 1) when a certain cheating tool is used.

Part (A) of FIG. 11 shows a metadata vector MV for an ordinary player who is not a cheater. It is assumed that this player happened to use the abovementioned cheating tool or conduct actions suspected of being cheating during a period in the past. Thus, values accumulated in the past are slightly reflected in the values (scores) of the element op[1] and the element op[3] in the metadata vector MV. As described earlier with reference to FIG. 5, at the time in the past when the player performed cheating or an action suspected of being cheating, the player is moved from ordinary group UG1 to cheater group CG1. In this case, a screen such as screen 13 or screen In in FIG. 4 is displayed on the player terminal 1 of the player. Thus, suppose that the player recognized that only other players the player was allowed to view information about or cooperate with were cheaters and immediately quit cheating or actions suspected of being cheating. In this case, the player returns to the operation tendencies for performing the zeroth kind of operation and the second kind of operation (tendencies that the values of the elements op[0] and op[2] on recent rows of the OLM become 1). Here, as described earlier, the vector vec(u) in equation (1) is subjected to the second weighting control based on the tweight( ) function by the second weight control unit 112. That is, control is executed to apply higher weights to history information about recent operations and to apply lower weights to history information about past operations. Thus, the vector vec(u) becomes a metadata vector MV in which recent operations are strongly reflected. That is, as shown in part (A) of FIG. 11, the values (scores) of the element op[0] and the element op[2] in the metadata vector MV become higher, strongly reflecting history information about recent operations. That is, the operation tendencies return to ordinary operation tendencies for the values (scores) of the element op[0] and the element op[2] in the metadata vector MV to be high. As a result, the player can return from cheater group CG1 to ordinary group UG1.

On the other hand, part (B) of FIG. 11 shows a metadata vector MV for a habitual cheater. Although lower weights are applied to history information about past operations in the tweight( ) function, if a cheating tool is used habitually, the values (scores) of the element op[1] and the element op[3] in the metadata vector MV naturally become high due to the accumulation of habitual operations in the past. Thus, even if the habitual cheater has recently quit the use of the cheating tool, the operation tendencies for the values (scores) of the element op[1] and the element op[3] in the metadata vector MV to be high, i.e., the tendencies specific to cheaters, do not change while the quitting period is short. As a result, the cheater cannot get out of the cheater group (group CG3 in the example in FIG. 5).

By using the vector vec(u) in equation (1), i.e., a metadata vector MV for a subject player u, as described above, it becomes possible to realize clustering in which similarity in basic actions among players is calculated, while quickly responding to recent operations performed by the player. A specific example of clustering by the clustering unit 103 will be further described below.

In order to generate player groups, the clustering unit 103 executes clustering processing by using the metadata vectors MV for the individual players. Thus, a performance advantage is afforded by taking the following measures for the metadata vectors MV for the individual players.

Specifically, in this paragraph, the total number of players registered in the game will be signified by m, the average number of actions recorded as operation history information of each player by n, and the number of elements of a metadata vector MV (the number of features in the vector space) by k. In this case, assuming that metadata vectors MV are generated for all the players, it is necessary to repeat the processing n×k+n×m×k times. This is because the common denominator atm (see FIG. 10) is used in calculating metadata vectors MV for all the players, as expressed in equation (1) given earlier, and thus it suffices to calculate the denominator just once. For example, suppose that an average of n=2,000 pieces of history information are kept for each of m=1,000,000 players and that the number of elements in a metadata vector MV, such as the kinds of operation, is k=30,000. In this case, about 60 trillion repetitions (2,000× 30,000+2,000×1,000,000×30,000) are necessary. Here, instead of executing this repeated processing each time, the feature-information generating unit 102 may cache intermediate calculation results and execute processing as incremental calculations. Furthermore, for past history information, the values weighted with the tweight( ) function do not substantially change. Thus it is possible to reuse the results of calculation without having to calculate weighted values each time. Furthermore, for the numerator a2c (see FIG. 10) in equation (1), since the calculation involves only addition, just by adding the values of newly added history information to the latest calculation result, it is possible to obtain substantially the same result as in the case where the entire calculation is performed each time. Furthermore, since there is no meaning in detecting dormant players as cheater, metadata vectors MV may be calculated only for active players. With these features, the feature-information generating unit 102 can employ incremental calculation using cached intermediate calculation results in calculating metadata vectors MV. Therefore, it becomes possible to calculate metadata vectors MV used in the clustering processing by the clustering unit 103 substantially at the following calculation costs. Specifically, for example, suppose that there are 200 thousand active players among m=1 million players. Also suppose that the feature-information generating unit 102 generates a metadata vector MV each time a certain amount of operation history information, e.g., 10 pieces, are added. In this case, about 60 billion repetitions (10×30,000+ 10×200,000×30,000) suffice. That is, compared with the abovementioned theoretical calculations costs involving about 60 trillion repetitions, it becomes possible to calculate metadata vectors MV used in the clustering processing by the clustering unit 103 at about a one-hundred-fold speed.

In order to generate player groups, the clustering unit 103 executes clustering processing by using the metadata vectors MV generated in the manner described above.

The clustering algorithm in this case is not particularly limited, and an arbitrary algorithm may be adopted. Specifically, for example, k-means clustering may be adopted. With k-means clustering, nodes (the metadata vectors MV for the individual players) are recursively attributed to randomly set k cluster-center candidates, which makes it possible to generate clusters automatically at high speed. Furthermore, since the metadata vectors MV are vectors in a multi-dimensional vector space, it is possible to calculate similarity between players by using a method of calculating similarity in a vector space, such as cosine similarity. Since cosine similarity represents similarity in terms of the angle formed by vectors, the similarity becomes higher as the value becomes closer to a maximum value of "1", and the similarity becomes lower as the value becomes closer to a minimum value of "0". The cosine similarity cos(a, b) between vectors a and b can be defined by equation (2) below.

[Eq. 2]

$$\cos(a, b) := \frac{\sum_{i=0}^{n} a_i \cdot b_i}{\sqrt{\sum_{i=0}^{n} a_i^2} \cdot \sqrt{\sum_{i=0}^{n} b_i^2}} \quad (2)$$

The other-player-information sending control unit 104 generates other-player information on the basis of the results of clustering by the clustering unit 103. As described earlier, other-player information refers to information that allows a particular player to view information about other players or to cooperate with other players in the game. Here, in this embodiment, the other-player-information sending control unit 104 controls sending of other-player information such that other players are restricted to those belonging to the same group. Thus, cheaters are isolated from honest, ordinary players. Therefore, ordinary players can enjoy the game comfortably without feeling unpleasant about cheating actions. In other words, for a habitual cheater, honest, ordinary players are isolated, and only other cheaters using the same cheating tool are presented as other players. Thus, the cheater will recognize that the service provider (game administrator or the like) is detecting cheating actions. As a result, it is expected that the cheater will quit cheating actions. This serves to suppress cheating actions themselves.

Here, in this embodiment, the CPU 51 of the server 2 calculates a possibility of cheating being conducted (cheat-probability) by using the status information of players classified in each group. The method of calculating the cheat-probability is not particularly limited, and for example, different methods may be adopted for individual game titles. Specifically, for example, a method in which the cheat-probability is calculated from status changes, such as a rise in the status of each player in a short period or the acquisition of a rare item in a short period, may be adopted. As another example, a method in which the cheat-probability is calculated from the status of communications with each client may be adopted.

Here, when a cluster having a cheat-probability exceeding a threshold is rapidly expanding (the number of players classified in that group is increasing), that indicates a possibility that a cheating method that has been unknown is spreading. Thus, the CPU 51 of the server 2 issues an alarm to the service provider about the emergence of a new cheating method (that has been unknown). As described above, by monitoring changes in cluster sizes, it becomes possible to send an emergency alarm to the service provider about the emergence of a new cheating method that has been unknown.

Figure 12:
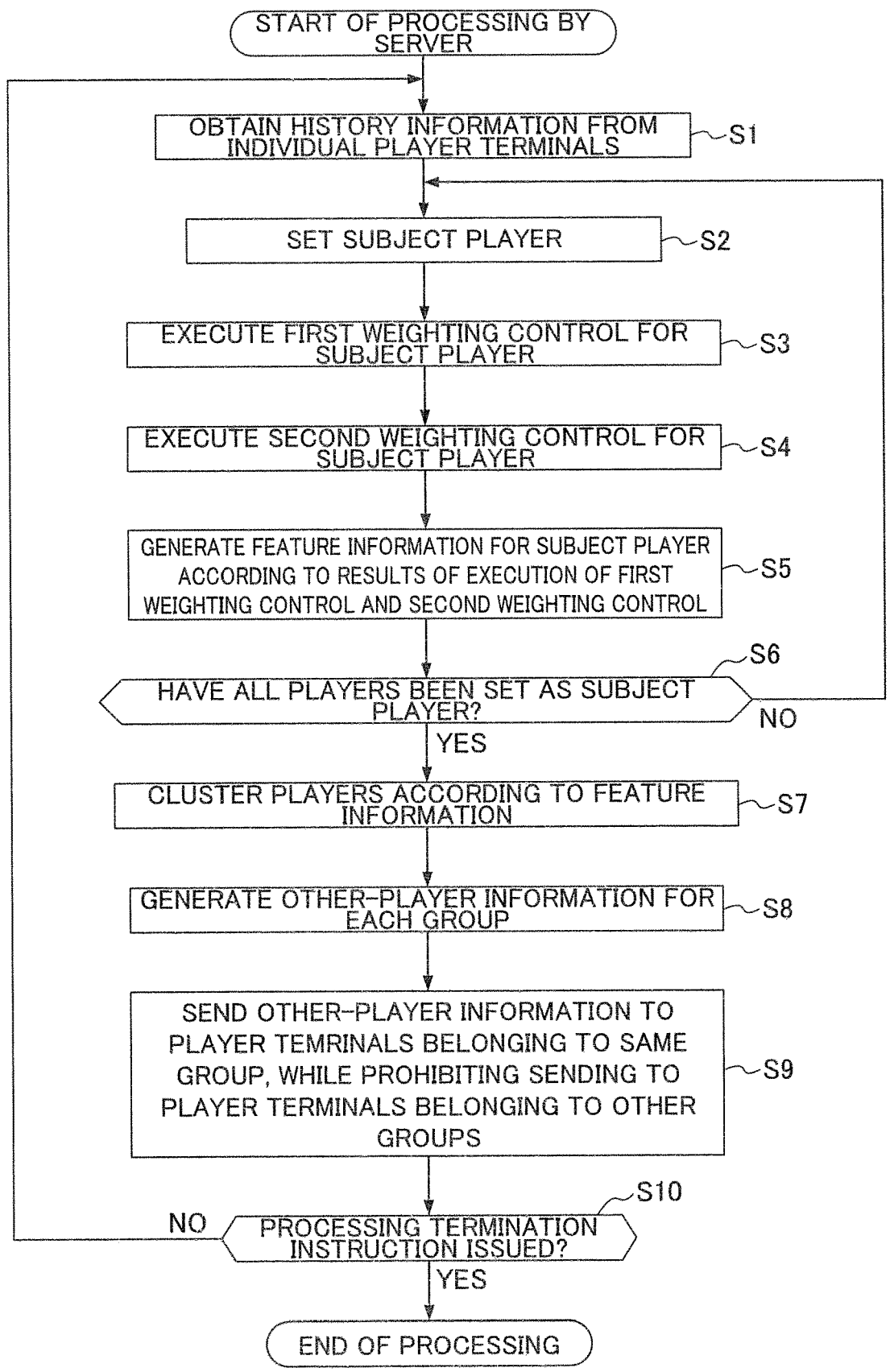
FIG. 12 is a flowchart for explaining an example of the flow of processing by the server having the functional configuration in FIG. 4.

The functional configuration of the server 2 for realizing the cheat suppression control has been described above. Next, a flow of processing by the server 2 having the functional configuration will be described with reference to FIG. 12. FIG. 12 is a flowchart for explaining a flow of processing by the server 2.

In step S1, the history-information obtaining unit 101 of the server 2 obtains history information from the individual terminals 1-0 to 1-$m$.

In step S2, the feature-information generating unit 102 sets a subject player. In step S3, the first weight control unit 111 executes the first weighting control for the subject player. In step S4, the second weight control unit 112 executes the second weighting control for the subject player. In step S5, the weighting calculation unit 113 generates a metadata vector MV as feature information for the subject player on the basis of the results of execution of the first weighting control and the second weighting control.

Here, in the case where the vector vec(u) in equation (1) given earlier is adopted as the metadata vector MV, the first weighting control refers to weighting control by dividing the numerator a2c by the denominator atm of each element in equation (1). Furthermore, the second weighting control refers to weighting control using the tweight( ) function in the numerator a2c (see FIG. 10) in equation (1) given earlier. That is, steps S2 and S4 described above are executed substantially at the same time as the calculation of equation (1) given earlier.

In step S6, the feature-information generating unit 102 determines whether all the players have been set as a subject player. Although "all the players" here may be all the players registered in the game, alternatively, as described earlier, "all the players" here may be all active players in order to improve performance. That is, "all the players" refers to all the players as defined in advance according to a predetermined rule (e.g., a rule dictating limitation to active players). In other words, "all the players" here refers to a set including at least some of the whole set of players registered in the game.

In the case where there is a player who has not been set as a subject player among all the players, the determination in step S6 results in NO. Then, the processing returns to step S2, and the subsequent processing is repeated. In the case where every player has been set as a subject player and metadata vectors MV have been generated as feature information through the processing in steps S3 to S5, the determination in step S6 results in YES, and the processing proceeds to step S7.

In step S7, the clustering unit 103 clusters the players on the basis of the feature information.

In step S8, the other-player-information sending control unit 104 generates other-player information for each group. In step S9, the other-player-information sending control unit 104 sends the other-player information to the player terminals 1 belonging to the same group, while prohibiting sending to the player terminals 1 belonging to other groups.

In step S10, the CPU 51 of the server 2 determines whether an instruction for terminating processing has been issued. Here, although the instruction for terminating processing is not particularly limited, a power supply interruption of the server 2 is adopted in this embodiment. That is, the power supply for the server 2 is interrupted, the determination in step S10 results in YES, and the processing by the server 2 is terminated. On the other hand, unless the power supply for the server 2 is interrupted, the determination in step S10 results in NO. Then, the processing returns to step S1, and the subsequent processing is repeated.

Although not shown in FIG. 12, as described earlier, the CPU 51 of the server 2 calculates a possibility of cheating being conducted on the basis of the status information of players classified in each group formed by clustering through the processing in step S7. Furthermore, the CPU 51 compares the cheat-probability with a threshold for each group. When a cluster having a cheat-probability exceeding the threshold is rapidly expanding, the CPU 51 issues an alarm to the service provider to the effect that the cluster is a group of cheaters using a new cheating method (that has been unknown).

Although an embodiment of the present invention has been described above, it is to be noted that the present invention is not limited to the above-described embodiment and that modifications, improvements, etc. within a scope in which it is possible to achieve the object of the present invention are encompassed in the present invention.

For example, the functional configuration in FIG. 6 is only an example, and there is no particular limitation to this example. That is, it suffices that an information processing system be provided with functions that enable the execution of the above-described series of processing steps as a whole, and the choice of functional blocks for implementing the functions is not particularly limited to the example in FIG. 6. Furthermore, the locations of the functional blocks are not particularly limited to those in FIG. 6 and may be arbitrarily set. For example, the functional blocks of the server 2 may be transferred to the player terminal 1, etc., and conversely, the functional blocks of the terminal 1 may be transferred to the server 2, etc. Furthermore, each functional block may be implemented by hardware alone, by software alone, or by a combination of hardware and software.

In a case where the series of processing steps is executed by software, a program constituting the software is installed on a computer, etc. via a network or from a recording medium. The computer may be a computer embedded in special hardware. Alternatively, the computer may be a computer that can execute various functions when various programs are installed thereon, such as a server or a general-purpose smartphone or personal computer.

A recording medium including such a program is implemented by a removable medium (not shown) that is distributed separately from the main unit of the apparatus in order to provide the program to a player, a recording medium that is provided to a player as embedded in the main unit of the apparatus, etc.

In this specification, steps dictated in the program recorded on the recording medium may include not only processing that is executed sequentially in order of time but also processing that is not executed sequentially in order of time but is executed in parallel or individually. Furthermore, in this specification, the term "system" should be construed to mean an overall apparatus constituted of a plurality of devices, a plurality of means, etc.

In other words, an information processing system according to the present invention may be embodied in various forms configured as follows, including the information processing system according to the above-described embodiment in FIG. 1. Specifically, an information processing system according to the present invention is an information processing system including a plurality of terminals (e.g., the player terminals 1-0 to 1-$m$ in FIG. 1) that are capable of accepting individual operations by a plurality of players and executing a game and also including a server (e.g., the server 2 in FIG. 1). The server includes: history-information obtaining means (e.g., the history-information obtaining unit 101 in FIG. 6) for executing, for each of the plurality of players, processing for obtaining operation history information of a particular player during execution of the game from a terminal of the particular player; and feature-information generating means (e.g., the feature-information generating unit 102 in FIG. 6) for generating, for each of the plurality of players, feature information representing a feature of operations performed by the particular player in the form of a certain weighted value obtained from the operation history information of the particular player. The feature-information generating means includes: first weight control means (e.g., the first weight control unit 111 in FIG. 6) for executing control so as to increase a weighted value for the particular player when an operation tendency of the particular player has become peculiar in relation to an operation tendency of a set of players including at least some of the plurality of players; second weight control means (e.g., the second weight control unit 112 in FIG. 6) for controlling the weighted value of the particular player in accordance with the time elapsed since an operation timepoint of the particular player; and weighting calculation means (e.g., the weighting calculation unit 113 in FIG. 6) for generating the feature information for each of the plurality of players by calculating the weighted value for each of the plurality of players on the basis of the results of control by the first weight control means and the second weight control means.

The feature information (e.g., the metadata vector MV described earlier) for the particular player, generated as described above, is obtained as a result of integrally executing first weighting control based on commonalities among a large number of players (the control by the first weight control means) and second weighting control based on time (the control by the second weight control means on the basis of the operation history information of the particular player. By using such feature information for players, it becomes possible to realize a technology for appropriately detecting various kinds of cheating or actions suspected of being cheating, including cheating conducted by using unknown cheating methods.

Specifically, the following first to fourth conditions are required in order to realize a technology for appropriately detecting various kinds of cheating or actions suspected of being cheating, including cheating conducted by using unknown cheating methods. The first condition is the absence of false-positives, i.e., not detecting an innocent user incorrectly as a cheater and taking a measure such as banning the account. The second condition is an ability to deal with cheating that is difficult to distinguish from errors that can occur normally. That is, the second condition is the ability to immediately respond to the execution of actions suspected of being cheating even if those actions cannot be determined as cheating because cheating tools send data for cheating in such forms that the data will be recognized incorrectly as errors. The third condition is a real-time dealing ability. That is, the third condition is an ability to immediately respond to the execution of cheating or actions suspected of being cheating and to notify a service provider. The fourth condition is compatibility, i.e., being highly compatible with existing operating systems, anti-virus software, and game systems themselves, and thus not involving any possibility of hindering the execution of existing software.

With existing technologies, it has not been possible to satisfy at least one of the first to fourth conditions.

For example, with the technology in Patent Literature 1, described earlier in the [Background Art] section, players suspected of being cheaters are grouped. Thus, in the case where a player suspected of being a cheater is an innocent player, the first condition is not satisfied unless a measure for letting the cheater get out of the group of cheaters is taken. However, no appropriate measure is found in the patent literature. Furthermore, in the case where cheating is conducted by using an unknown cheating method that is difficult to distinguish from errors that can occur normally, with the technology of Patent Literature 1, it is difficult to deal with the cheating in real time and to notify a service provider. That is, it is difficult to satisfy the second and third conditions.

In contrast, the information processing system according to the present invention can satisfy the first to fourth conditions.

Specifically, with the first weighting control, the weighted value is decreased for an operation tendency that is common among a large number of players, and the weighted value is increased for a peculiar operation tendency that is common only among a small number of players. This makes it possible to appropriately extract players exhibiting behavior (operation tendency) specific to cheating, even if unknown cheating methods are involved, as well as known cheating methods. Furthermore, with the second weighting control, history information for recent operations is weighted strongly, and history information for past operations is weighted weakly. This makes it possible to easily perform monitoring in real time in view of the scale (size) of a player group having a similar operation tendency, for example, even if the operation tendency is one that has not been observed before. Therefore, for example, in the case where the scale of a group of players having a similar operation tendency that has not been observed before is increasing, it is possible to immediately notify the service provider to the effect that cheating (or actions suspected of being cheating) conducted by using an unknown cheating method has emerged. As described above, the information processing system according to the present invention can satisfy the second and third conditions.

Here, it suffices for the service provider to take a measure such as isolating the players determined as conducting cheating (or actions suspected of being cheating) by using an unknown cheating method from players having ordinary operation tendencies, instead of taking a measure such as banning their accounts. Accordingly, the players can recognize that they are being monitored as players conducting cheating (or actions suspected of being cheating) by using an unknown cheating method. In the case where such a player immediately quits cheating (or actions suspected of being cheating) and returns to normal operation, since history information for recent operations are strongly weighted by the second weighting control, the feature information returns to that representing ordinary operation tendencies. As a result, the player is freed from the label of being a player conducting cheating (or actions suspected of being cheating). On the other hand, in the case where the player does not quit cheating, history information for the cheating operations is accumulated cumulatively. Therefore, even though history information for past operations is weakly weighted by the second weighting control, the feature information remains to represent operation tendencies associated with cheating. As described above, the information processing system according to the present invention can satisfy the first condition.

Furthermore, the information processing system according to the present invention can satisfy the fourth condition since it just uses operation history information of players.

Since the information processing system according to the present invention can satisfy the first to fourth conditions, as described above, it becomes possible to appropriately detect cheating conducted by using an unknown cheating method or a cheating method that is difficult to detect and thus to immediately deal with such cheating. Specifically, it becomes possible, as immediate measures, to isolate cheaters using an unknown cheating method or a cheating method that is difficult to detect such that those cheaters become invisible to ordinary players and to issue an alarm to the game administrator about the emergence of the cheaters.

Here, the method for determining whether or not a particular player is conducting cheating (or actions suspected of being cheating) is not particularly limited and may be any method utilizing feature information of the particular player. However, in order to monitor, in real time, the emergence of cheating conducted by using an unknown cheating method or in order to isolate players conducting cheating (or actions suspected of being cheating) from ordinary players, it is preferable to introduce clustering based on feature information and determination on a per-group basis. Specifically, the server should preferably include clustering means (e.g., the clustering unit 103 in FIG. 6) for clustering a plurality of players on the basis of individual feature information of the plurality of players.

Here, the history-information obtaining means may: execute, for each of the plurality of players, processing for obtaining operation history information of the particular player for each of a plurality of kinds of operation accepted in the game, and the weighting calculation means may: calculate a plurality of weighted values individually associated with the plurality of kinds of operations, and generate, for each of the plurality of players, feature information including the plurality of weighted values as elements thereof. This makes it possible to generate feature information in the form of vectors (the metadata vectors described earlier) existing in a multi-dimensional space having axes corresponding to the individual kinds of operation. As a result, it becomes possible to readily and appropriately calculate the similarity of feature information among the individual players by using distances, etc. in the multi-dimensional space, which makes it possible to readily and appropriately extract players having similar operation tendencies. That is, it becomes possible to readily and appropriately distinguish between a group of players having operation tendencies associated with cheating (or actions suspected of being cheating) and a group of players having ordinary operation tendencies. This makes it possible to more appropriately detect various kinds of cheating and actions suspected of being cheating, including cheating conducted by using unknown cheating methods.

Furthermore, the first weight control means may execute control so as to use a fractional value as the weighted value for the particular player, in which: the numerator is a cumulative value of a time series of the operation history information of the particular player; and the denominator is the sum of individual cumulative values of time series of the operation history information of the plurality of players. This makes it possible to execute the first weighting control more appropriately.

Furthermore, the second weight control means may execute control so as to: weight the time series of the operation history information of the particular player with a weight that is decreased as the time elapsed from an operation time-point of the particular player becomes longer; and use a cumulative value of the weighted time series of the operation history information as the numerator. This makes it possible to execute the second weighting control more appropriately.

Here, the second weight control means may further execute control so as to quit decreasing the weight when the time elapsed from the operation time-point of the particular player exceeds a certain period. Accordingly, although history information for past cheating operations are weighted weakly, in the case where cheating is conducted habitually, since a large number of cheating operations are accumulated, the weighted value naturally becomes greater. Thus, a habitual cheater still continues to exhibit operation tendencies specific to cheaters while the quitting period is short even if the cheater has recently quit cheating. As a result, the cheater is not freed from the label of being a player conducting cheating (or actions suspected of being cheating).

Furthermore, the server may further include sending control means (e.g., the other-player-information sending control means 104 in FIG. 6) for executing control so as to send information about other players belonging to the same group to the individual terminals of the plurality of players clustered by the clustering means, while prohibiting sending of information about other players belonging to other groups. This serves to effectively take a measure for isolating players determined as conducting cheating (or actions suspected of being cheating) by using an unknown cheating method from players having ordinary operation tendencies. As a result, the players recognize that they are being monitored by the service provider as players conducting cheating (or actions suspected of being cheating). This serves to suppress cheating itself.

EXPLANATION OF REFERENCE NUMERALS 1, 1-1 to 1-m Player terminals
2 Server
21 CPU
51 CPU
101 History-information obtaining unit
102 Feature-information generating unit
103 Clustering unit
104 Other-player-information sending control unit
111 First weight control unit
112 Second weight control unit
113 Weighting calculation unit

The invention claimed is:
1. An information processing system comprising:
a plurality of terminals that are capable of accepting individual operations by a plurality of players and executing a game; and
a server, wherein the server includes:
a processor coupled to a memory,
wherein the processor executes, for each of the plurality of players, processing for obtaining operation history information of a particular player during execution of the game from a terminal of the particular player;
wherein the processor generates, for each of the plurality of players, feature information representing a feature of operations performed by the particular player in the form of a weighted value obtained from the operation history information of the particular player, and
wherein the weighted value for the particular player is controlled by the processor, the processor controlling:
a first weight control for executing control so as to increase the weighted value for the particular player when an operation tendency of the particular player has become peculiar in relation to an operation tendency of a set of players including at least some of the plurality of players, a second weight control for controlling the weighted value of the particular player in accordance with time elapsed since an operation time-point of the particular player; and wherein the processor generates the feature information for each of the plurality of players by calculating the weighted value for each of the plurality of players based on the results of control by the first weight control and the second weight control, and wherein the processor distinguishes, based on the weighted value for the particular player, between which players among the plurality of players have a predetermined operation tendency associated with the game.

2. The information processing system of claim 1, wherein the predetermined operation tendency is an ordinary operation tendency of the plurality of players.

3. A server that carries out communications individually with a plurality of terminals that are capable of accepting individual operations by a plurality of players and executing a game, the server comprising:

a processor coupled to a memory, wherein the processor executes, for each of the plurality of players, processing for obtaining operation history information of a particular player during execution of the game from a terminal of the particular player;

wherein the processor generates, for each of the plurality of players, feature information representing a feature of operations performed by the particular player in the form of a weighted value obtained from the operation history information of the particular player, and wherein the weighted value for the particular player is controlled by the processor, the processor controlling:

a first weight control for executing control so as to increase the weighted value for the particular player when an operation tendency of the particular player has become peculiar in relation to an operation tendency of a set of players including at least some of the plurality of players, a second weight control for controlling the weighted value of the particular player in accordance with time elapsed since an operation time-point of the particular player; and wherein the processor generates the feature information for each of the plurality of players by calculating the weighted value for each of the plurality of players based on the results of control by the first weight control and the second weight control, and wherein the processor distinguishes, based on the weighted value for the particular player, between which players among the plurality of players have a predetermined operation tendency associated with the game.

4. The server according to claim 3,
wherein
processing for obtaining operation history information of the particular player for each of a plurality of kinds of operation accepted in the game by the processor is executed for each of the plurality of players, and wherein the processor:

calculates a plurality of weighted values individually associated with the plurality of kinds of operations, and generates, for each of the plurality of players, feature information including the plurality of weighted values as elements thereof.

5. The server according to claim 3,
wherein the processor, as the first weight control, executes control so as to use a fractional value as the weighted value for the particular player, in which:

the numerator is a cumulative value of a time series of the operation history information of the particular player; and the denominator is the sum of individual cumulative values of time series of the operation history information of the plurality of players.

6. The server according to claim 5,
wherein the processor, as the second weight control, executes control so as to:

weight the time series of the operation history information of the particular player with a weight that is decreased as the time elapsed from an operation time-point of the particular player becomes longer; and use a cumulative value of the weighted time series of the operation history information as the numerator.

7. The server according to claim 6, wherein the processor, as the second weight control, further executes control so as to quit decreasing the weight when the time elapsed from the operation time-point of the particular player exceeds a certain period.

8. The server according to claim 3,
wherein the processor further executes clustering control for clustering the plurality of players on the basis of the feature information for each of the plurality of players.

9. The server according to claim 8,
wherein the processor further executes control so as to send information about other players belonging to the same group to the individual terminals of the plurality of players clustered by the clustering control, while prohibiting sending of information about other players belonging to other groups.

10. A non-transitory computer readable medium storing a program for a computer that carries out communications individually with a plurality of terminals that are capable of accepting individual operations by a plurality of players and executing a game, the program causing the computer to execute control processing comprising:

executing, by a processor coupled to a memory, for each of the plurality of players, processing for obtaining operation history information of a particular player during execution of the game from a terminal of the particular player;

generating, by the processor, for each of the plurality of players, feature information representing a feature of operations performed by the particular player in the form of a weighted value obtained from the operation history information of the particular player, and wherein the weighted value for the particular player is controlled by the processor, the processor controlling:

a first weight control for executing control so as to increase the weighted value for the particular player when an operation tendency of the particular player has become peculiar in relation to an operation tendency of the plurality of players as a whole, a second weight control for controlling the weighted value of the particular player in accordance with the time elapsed since an operation time-point of the particular player; and generating by the processor, the feature information for each of the plurality of players by calculating the weighted value for each of the plurality of players based on the results of control by the first weight control and the second weight control, and distinguishing by the processor, based on the weighted value for the particular player, between which players among the plurality of players have a predetermined ordinary operation tendency associated with the game.

* * * * *